United States Patent [19]

Zimmerman

[11] Patent Number: 4,697,659

[45] Date of Patent: Oct. 6, 1987

[54] VEHICLE FRACTION ATTACHMENT

[76] Inventor: Tony J. Zimmerman, 411 E. Main St., Stuarts Draft, Va. 22447

[21] Appl. No.: 855,281

[22] Filed: Apr. 24, 1986

[51] Int. Cl.⁴ ............................................. B60B 15/00
[52] U.S. Cl. .................................. 180/15; 180/24.12; 474/903
[58] Field of Search ..................... 180/15, 16, 22, 9.26, 180/24.08, 251, 215, 72, 59, 24.12; 474/152, 162, 165; 301/11 R, 38 R; 172/260.5, 414

[56] References Cited

U.S. PATENT DOCUMENTS

| | | | |
|---|---|---|---|
| 2,187,658 | 1/1940 | Lane et al. | 180/251 |
| 3,161,172 | 12/1964 | Kassbohrer | 180/24.08 |
| 3,349,931 | 10/1967 | Wagner | 180/72 |
| 3,584,699 | 6/1971 | Urick | 180/15 |
| 3,860,297 | 1/1975 | Solis | 301/38 R |

FOREIGN PATENT DOCUMENTS

| | | | |
|---|---|---|---|
| 206553 | 3/1908 | Fed. Rep. of Germany | 180/15 |
| 96931 | 10/1960 | Norway | 180/22 |

Primary Examiner—John J. Love
Assistant Examiner—Karin L. Ferriter
Attorney, Agent, or Firm—James C. Wray

[57] ABSTRACT

A vehicle attachment has a pivoting frame connected to the rear driven axle of a vehicle, drivable wheels mounted on opposite ends of a drivable axle, an adjustable tension element that is capable of providing varying degrees of downward force on the drivable wheels. A sprocket is connected to the vehicle rear axle and another sprocket is connected to the drivable axle, the two sprockets being interconnected by a chain such that rotation of the vehicle rear axle causes rotation of equal velocity of the drivable axle.

11 Claims, 7 Drawing Figures

VEHICLE FRACTION ATTACHMENT

BACKGROUND OF THE INVENTION

The present invention relates generally to all terrain vehicles and more specifically to a device for increasing the safety, traction, and load carrying capacity of all terrain vehicles.

A need exists for a vehicle attachment that is easily connected and disconnected to an all terrain vehicle and can be easily and inexpensively manufactured.

Pertinent United States and foreign patents are found in class 180, motor vehicles, subclasses 222, 239, 251, 24.12, 24.08, and 72.

Examples of pertinent patents are U.S. Pat. Nos. 3,584,699; 2,934,157; and 2,298,054.

U.S. Pat. No. 3,584,699 shows an attachment having plural chain drives for use in connection with a differential rear axle. The patent does not show a single drive chain and does not show a suspension capable of applying variable degrees of downward force on the rear drivable axle.

U.S. Pat. No. 2,298,054 shows an attachment but the attachment does not apply to an all terrain vehicle.

U.S. Pat. No. 2,934,157 does not show an attachment but it does show chain driven trailing and leading wheels.

None of the cited patents discloses an attachment of all terrain vehicles that is easily attached and disconnected and none shows an attachment capable of increasing the safety and traction of an all terrain vehicle.

SUMMARY OF THE INVENTION

The present invention overcomes the problems which exist in the prior art and provides a safe, effective, and simple vehicle attachment.

Specifically, it is known in the prior art that all terrain vehicles commonly known as "three wheelers" and "four wheelers" have a tendency to rear up and flip over backwards on the driver when climbing steep grades or even when accelerating on less precipitous grades. The present invention effectively increases the length of the wheel base for the vehicle thereby rendering it much less likely to rear up.

The present invention also has the ability to conform to the terrain over which the vehicle is passing such that the drivable wheels can angle upwardly or downwardly relative to the driven rear axle of the vehicle within limits. Once the limits are reached, the rear driven wheels of the vehicle may become airborne and completely out of contact with the terrain, or the drivable wheels associated with the attachment may likewise become airborne and out of contact with the terrain.

An object of the invention, therefore, is to render all terrain vehicles more safe to operate.

Another object of the invention is to provide a vehicle attachment that is both easy to connect to an all terrain vehicle and also to disconnect.

Yet another object of the invention is to provide a vehicle attachment that is easy and inexpensive to manufacture.

Another object of the invention is to provide a vehicle attachment that increases the traction of an all terrain vehicle.

Another object of the invention is to provide a vehicle attachment for vehicles having a solid positively driven rear axle, the attachment comprising, a first sprocket connected to the vehicle rear axle, a generally horizontally oriented frame assembly rigidly connectable to the vehicle rear axle and a frame connector means for connecting the frame to the vehicle rear axle, and pivotal means, fixedly connected to the connector means and pivotally connected to front end of the frame, for pivoting the frame up and down in response changes in terraine, a drivable axle mounted on a rear end of the frame and having tires mounted on opposite ends thereof, a second sprocket connected to the drivable axle, and means, connecting the first and second sprockets, for imparting motion in the drivable axle in response to motion in the vehicle rear axle.

In one embodiment, the attachment further comprises tension means for exerting downward pressure on the drivable axle thereby increasing the traction thereof.

In another embodiment, the tension means comprises rigid support arm inclining upwardly and rearwardly from the connector means and adjustable pressure means extending downwardly and rearwardly between a distal end of the support arm and mounting means connected to the frame.

In another embodiment, the pressure means comprises an air shock having valve means for applying varying amounts of pressure.

In another embodiment, the means for connecting the first and second sprockets comprises a chain.

In another embodiment, the connector means comprises a generally horizontally extending plate bolted at a medial portion of the vehicle rear axle and being generally in line with a longitudinal axis of the frame.

In another embodiment, the connector means comprises two frame extensions rigidly connected to the frame at forward most opposite side portions thereof and being bolted to the rear of the vehicle.

In another embodiment, the pivotal means comprises a pivot axle assembly rigidly mounted in a transverse direction at a rearward extending portion of the connector means.

In another embodiment, the pivot axle assembly comprises a support channel member connected to the connector means, an axle housing fixedly mounted within the support channel member, an axle disposed within the axle housing and having opposite end portions extending beyond opposite ends of the axle housing and through opposite side portions of the frame, and locking means disposed on opposite ends of the axle for locking opposite frame members on the axle, wherein the frame pivots about the axle. A bearing may be placed on each end of the axle to stop wear on the axle.

In another embodiment, the first sprocket is connected directly to the vehicle rear axle.

In another embodiment, the first sprocket is connected to the vehicle axle through a hub of the axle by adaptor means.

In a preferred embodiment, the adaptor means comprises a plurality of elongated bolts held in spaced relationship by encasement means, each bolt having a headed portion and being disposed within spacers, wherein a length of each bolt extends beyond an end of the spacer opposite the headed portions of the bolts, each length being inserted in an inboard side of the axle hub and extending outwardly to provide wheel mounting lugs, and wherein the first sprocket is fixedly attached to an inward most end of the encasement means.

In another embodiment, the encasement means comprises two lengths of angle iron, opposite sides of each being joined to form a generally rectangular encasement, each spacer being mounted in a corner of the encasement.

In another embodiment, the device has bearings connected to the rear portion of the frame for supporting the drivable axle.

In another embodiment, the mounting means comprises a plurality of longitudinally disposed mounts for selectively receiving an end of an extension arm of the air shock.

In another embodiment, the attachment has limiting means for limiting the pivot angle of the frame.

In a preferred embodiment, the limiting means comprise a bar connected to a rear portion of the vehicle and an upper obtusely angled portion of the rigid support arm, whereby abutment of the bar and the upper obtusely angled portion limit the upward angle of the frame with respect to the vehicle rear axle. Another limiting means is provided by a mount for the tension means and a cross member of the frame, whereby abutment of the mount and the cross member limits the downward angle of the frame with respect to the vehicle rear axle.

In another embodiment, the attachment comprises a bed supported in a vertically spaced location relative to the frame by vertical extensions.

Another object of the invention is to provide an adaptor for connecting a sprocket to a rear drivers axle of a vehicle comprising, a plurality of elongated bolts held in spaced relationship by encasement means, each bolt having a headed portion and being disposed within spacers, wherein a length of each bolt extends beyond an end of the spacer opposite the headed portions of the bolts, each length being inserted an inboard side of the axle hub and extending outwardly to provide wheel mounting lugs, and wherein the first sprocket is fixedly attached an inward most end of the encasement means.

These and other and further objects and features of the invention are apparent in the disclosure which includes the above and below specification and claims and drawings.

DETAILED DESCRIPTION OF THE DRAWINGS

Figure 1:
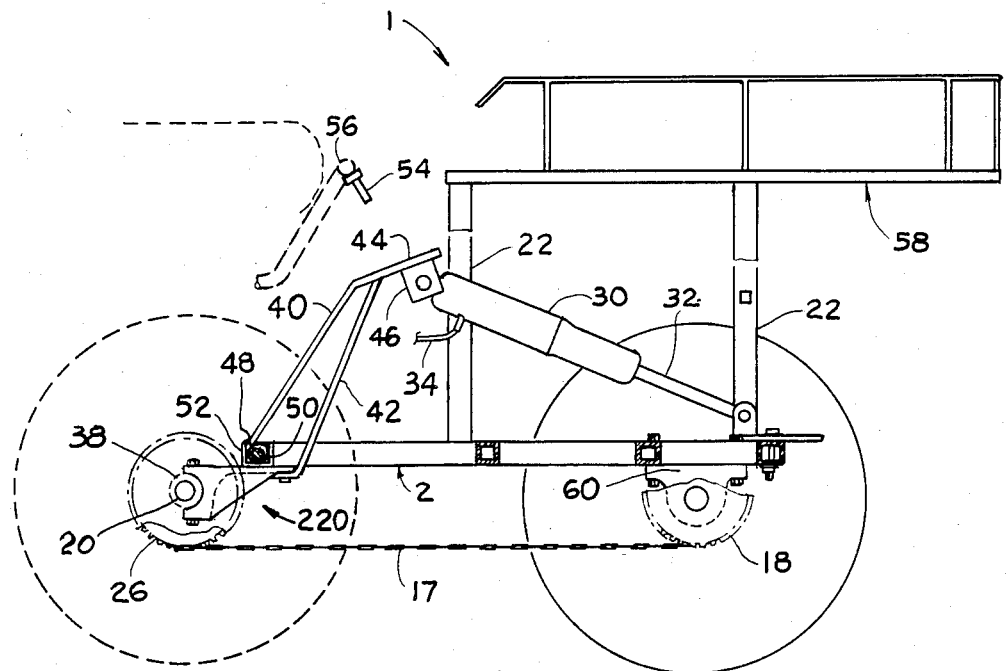
FIG. 1 is a side view, partly in section, of a vehicle attachment embodying features of the present invention.

Referring to FIG. 1 a vehicle traction attachment embodying features of the present invention is generally indicated by the numeral 1.

Figure 2:
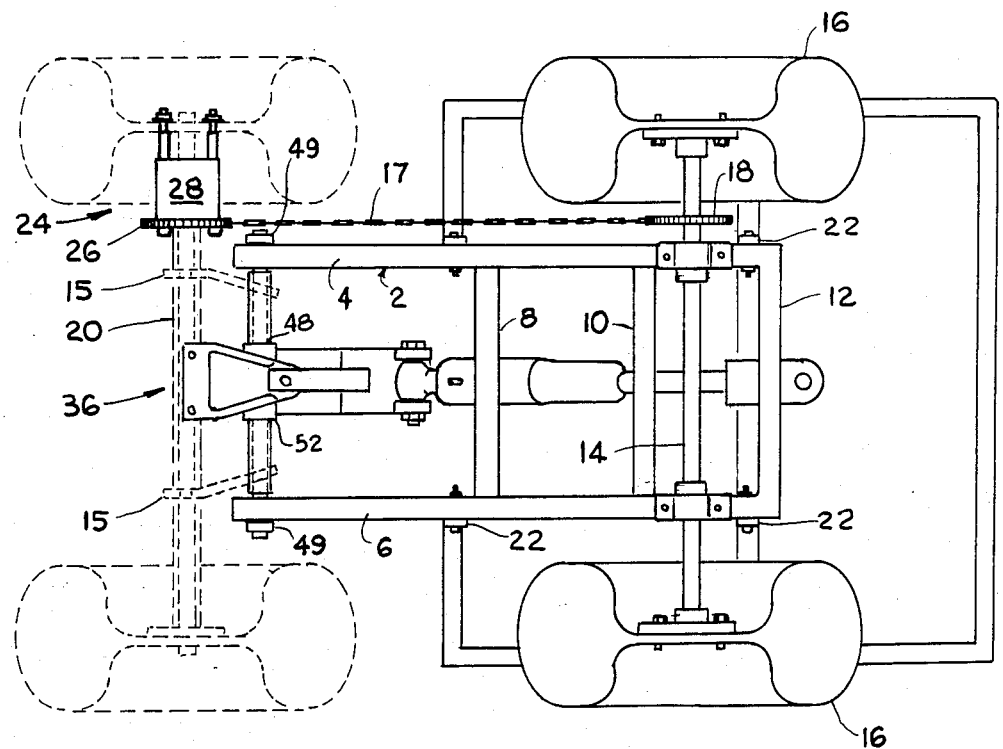
FIG. 2 is a bottom view of a vehicle attachment embodying features of the present invention.

Referring to FIGS. 1 and 2, a frame 2 has parallel longitudinal frame members 4, 6 and plural transverse frame members 8, 10, 12.

The frame supports a drivable axle 14 which is connected to a rear portion of the frame and positively drives wheels 16. As will become evident later, the wheels 16 of the vehicle attachment must have a diameter equal to the wheels of the driven rear axle of the vehicle. The drivable axle 14 is provided with a sprocket 18 which is fixedly connected to the axle 14 between a hub and the frame 2.

While the present invention does not include a rear driven axle of an all terrain vehicle, it is important that a drive sprocket 26 somehow be connected to a rear driven axle 20 of the vehicle.

Optionally, the frame may include vertical extensions 22 which may be used to support a bed 58. The bed 58 may be used to carry loads or additional passengers.

Figure 4:
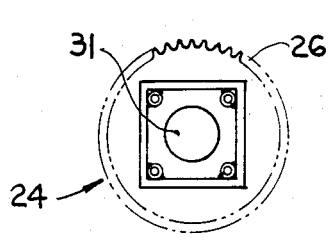
FIG. 4 is a plan view of an adaptor embodying features of the present invention.
Figure 5:
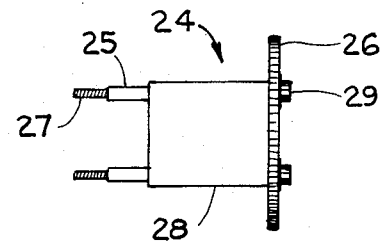
FIG. 5 is a side view of the adaptor of FIG. 4.
Figure 5A:
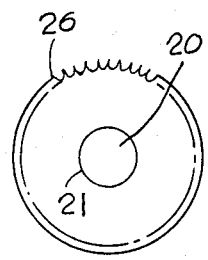
FIG. 5A is a plan view of the drive sprocket connected directly to the driven axle.

The sprocket 26 may be attached directly to the rear driven axle 20 of the vehicle by spot welds 21 or other suitable means as shown in FIG. 5A, or the sprocket may be attached by an adaptor which is connected to an axle hub associated with an attachment side of the axle. The adaptor, generally referred to as numeral 24 is shown in greater detail in FIGS. 4 and 5.

Referring now to FIGS. 2, 4, and 5, the adaptor 24 has a plurality of bolts 27 which are disposed within spacers 25. The spacers and bolts are permanently secured in corners of encasement 28. Significantly, end portions of the bolts 27 extend beyond in portions of the spacers 25. Each extended length provides a lug which can be used in connection with the hub of the driven rear axle for mounting a rear wheel of the vehicle. Each bolt 27 has a headed portion 29 which can be used to help secure the sprocket 26 to an end of the encasement 28. As seen in FIG. 2 the sprocket 26 is attached to the inboard end of the encasement 28 such that the sprocket is spaced inwardly from the hub and vehicle wheel (shown in broken lines).

Preferably, the encasement 28 is formed by two segments of angle iron which are turned toward each other to form a rectangular structure. The ends of the angle iron can be welded together to form a unitary encasement. Likewise, the spacers can be welded to the inside corners of the encasement. Preferably, the headed portions 29 of the bolts are spot welded to the sprocket 26 to prevent separation. The sprocket may also be welded to an end face of the encasement 28. The encasement 28 keeps the spacers and bolts in spaced relationship to one another.

Significantly, the sprocket used in the adaptor 24 has an opening 31 through which the driven axle 20 passes without making contact. Alternatively, the opening 31 may be fitted with a bearing or bushing to provide contact between the axle and the sprocket. Such contact may prevent the adaptor from being forced out of alignment with the axle due to torque.

Whether the sprocket 26 is applied directly to the axle or indirectly to the axle through the adaptor, a chin 17 interconnects the two sprockets to impart motion in the drivable axle 14 in response to motion in the driven axle 20. The spockets 18, 26 have the same size and number of teeth such that rotation of sprocket 26 will create rotation in sprocket 18 of equal velocity.

Referring now to FIGS. 1 and 2, the frame 2 is attached to the rear axle casing 38 which houses rear axle 20. It should be understood at this point that when the sprocket 26 is attached directly to the axle, no casing can be contemplated. In other words, for the sprocket 26 to be connected directly to the axle, the axle must be nonencased. In such embodiments of the invention, alternative attachment means may be required to rigidly attach the frame to the vehicle. Alternative attachment means may include frame extensions 15 that are rigidly connected to the frame at one end and connected to the vehicle at opposite ends. The connection may be to the rear suspension of the vehicle as for instance by a shock absorber mounting bolt. However, the preferred means for attaching the frame to the vehicle will be described in terms of an encased axle 20.

Referring to FIGS. 1 and 2, a bracket generally referred to by the numeral 36, is bolted to the rear axle casing at a medial portion thereof. The bracket 36 extends generally rearwardly along a longitudinal axis of the frame. It is important that the bracket 36 be rigidly connected to the axle. In another words, the bracket 36 is fixed to the axle encasement 38 and may not independently rotate or pivot.

A transverse mounted support channel member 52 is fixidly attached to an upper horizontal surface of the bracket 36. The support channel member is U-shaped and cross-sectioned and supports therein an axle housing 48 that extends substantially beyond opposite end portions of the support channel member 52. Preferably, the axle housing is permanently fixed by welding or other suitable means within the support channel member 52. The axle housing 48 supports a pivot axle 50 which is received within the housing 48 and extends beyond opposite end portions of the housing.

The portions of the axle that extend beyond the housing pass through the longitudinal frame members 4, 6 of the frame 2 so that the frame 2 may pivot about the pivot axle 50. Caps 49 are provided on end portions of the pivot axle 50 to maintain the arrangement and assembly of parts in FIG. 2.

The bracket 36 is also used to support portions of a tension device used to exert varying amounts of pressure on the drivable rear wheels 16 of the attachment. A rigid support arm 40 inclines upwardly and rearwardly from the bracket 36 and has an obtusely angled upper portion 44. A mount 46 is provided on an underside of the obtusely angled upper portion 44 for mounting one end of an air shock 30. The air shock has an extension arm 32 which extends downwardly and rearwardly between the mount 46 and a rear portion of the frame 2. The extension arm 32 is connected to a mount connected to a frame 2. By increasing the pressure in the air shock as, for instance, by inflating the shock through a valve and hose 34, more traction can be applied to a wheel 16 of the vehicle attachment. To increase the downward force applied by the air shock 30 the extension arm 32 may be mounted to a mount that is more forward than the one shown in FIG. 1. For instance, transverse frame member 10 may be provided with a mount such that the angle of the shock in relation to the frame becomes greater.

Figure 3:
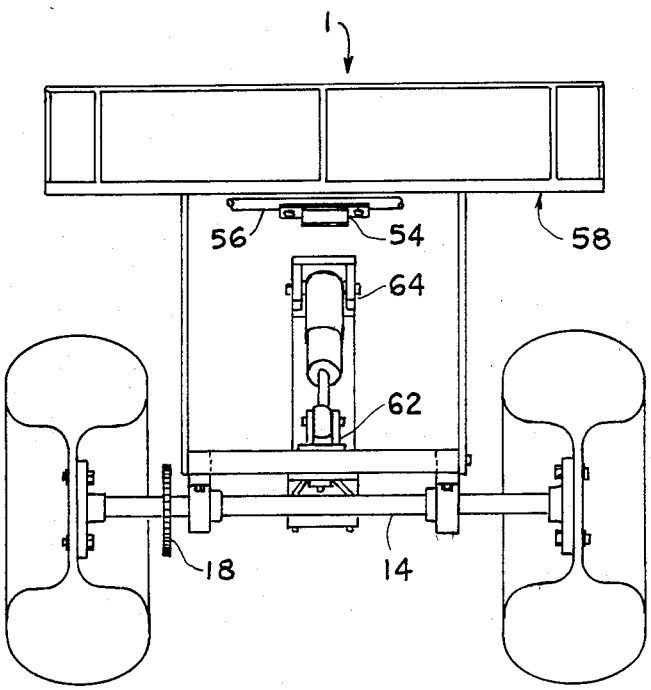
FIG. 3 is a rear view of the vehicle attachment shown in FIGS. 1 and 2.

Referring to FIG. 3, the present invention contemplates a bar 54 which is mounted to a rear portion of the vehicle such as to guard 56 such that the angle of incline of the drivable axle 14 relative to the driven axle 20 is limited by the abutment of the bar 54 with the obtusely angled upper portion 44.

Figure 6:
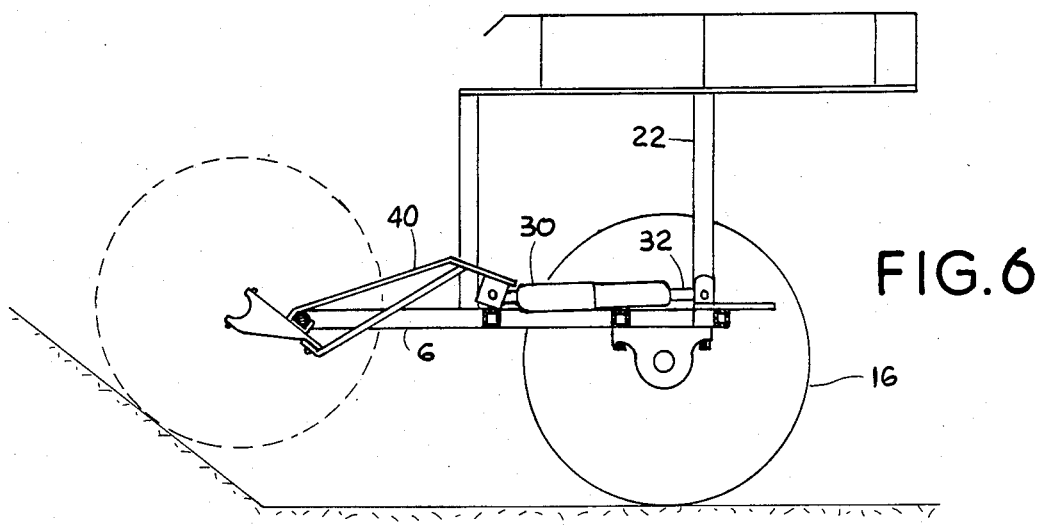
FIG. 6 is a side view of the vehicle attachment demonstrating the pivoting feature of the frame in response to changes in terrain.

The operation of the present invention can be better explained by reference to FIG. 6. In FIG. 6, the terrain is shown as having an inclined portion and a horizontal portion. When the rear axle 20 progresses up the incline, the support arm 40 pushes the air shock 30 down towards a horizontal position to a point where the mount 46 abuts transfers frame member 8, thereby limiting the degree of pivot of the frame with respect to the rear driven axle 20.

If the angle of incline of the terrain were instead an angle of decline, FIG. 6 would show that the pivot of the frame would be limited by the abutment of the bar 54 with the obtusely angled upper portion 44.

While the invention has been described with reference to specific embodiments, the exact nature and scope of the invention is defined in the following claims.

I claim:

1. An attachment for vehicles having at least one driven axle, the attachment comprising,
    a bracket fixedly connectable to a vehicle rear axle housing,
    a frame axle connected to the bracket,
    a frame assembly pivotally connected to the frame axle at one end and having a substantially horizontal orientation,
    a drivable axle connected to the opposite end of the frame assembly,
    a first sprocket adapted to be connected to a driven axle of the vehicle,
    a second sprocket connected to the drivable axle,
    a chain connecting the first and second sprockets thereby imparting motion in the drivable axle in response to motion in the vehicle rear axle,
    a support arm connected to the bracket and extending upwardly from the bracket, and
    a shock absorber connected to an upper end of the support arm and to the frame assembly for supplying downward force on the drivable axle, wherein the upper end of the support arm is adapted to abut the frame assembly to limit pivotal upward movement of the frame assembly with respect to the bracket.

2. The device of claim 1 wherein the shock absorber comprises an air shock having valve means for applying varying amounts of pressure.

3. The device of claim 1 wherein the bracket comprises a generally horizontally extending plate adapted to be bolted at a medial portion of the vehicle rear axle and generally in line with a longitudinal axis of the frame.

4. The device of claim 1 wherein the frame assembly further comprises two frame extensions adapted to be fixedly connected at one end to the vehicle and pivotally supporting the frame at the other end.

5. The device of claim 1 wherein said driven axle is rear axle of the vehicle.

6. The device of claim 1 wherein the first sprocket is connected to the vehicle axle through a hub of the axle by adaptor means.

7. The device of claim 6 wherein the adaptor means comprises a plurality of elongated bolts held in spaced relationship by encasement means, each bolt having a headed portion and being disposed within spacers, wherein a length of each bolt exntds beyond an end of the spacer opposite the headed portions of the bolts, each length being inserted in an inboard side of the axle hub and extending outwardly to provide wheel mounting lugs, and wherein the first sprocket is fixedly attached to an inward most end of the encasement means.

8. The device of claim 7 wherein the encasement means comprises two lengths of angle iron, opposite sides of each being joined to form a generally rectangular encasement, each spacer being mounted in a corner of the encasement.

9. The device of claim 1 further comprising bearings connected to the rear portion of the frame for supporting the drivable axle.

10. The device of claim 1 further comprising a bar connectable to a rear portion of the vehicle wherein an upper surface of the support arm is adapted to abutt the bar to limit the downward angle of the frame with respect to the vehicle rear axle.

11. The device of claim 1 further comprising a bed supported in a vertically spaced location relative to the frame by vertical extensions.

* * * * *

UNITED STATES PATENT OFFICE
CERTIFICATE OF CORRECTION

Patent No. 4,697,659           Dated  October 6, 1987

Inventor(s)    Tony J. Zimmerman

It is certified that error appears in the above-identified patent and that said Letters Patent are hereby corrected as shown below:

On the Title Page, Item [54]:

The title of the invention is changed to read:

VEHICLE TRACTION ATTACHMENT

Signed and Sealed this

Ninth Day of February, 1988

Attest:

DONALD J. QUIGG

Attesting Officer      Commissioner of Patents and Trademarks